Nov. 8, 1932.         C. W. WILLIAMS         1,886,927
AIR FILTER
Original Filed Sept. 9, 1927    2 Sheets-Sheet 1
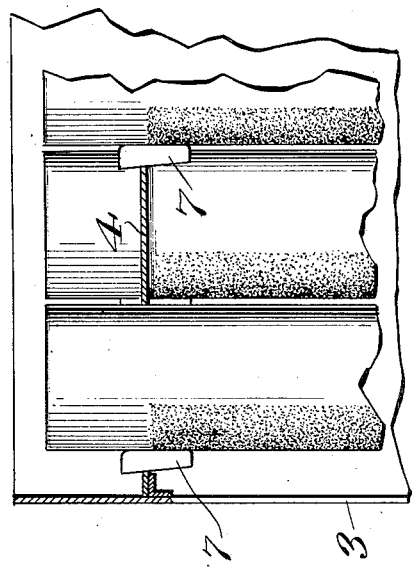
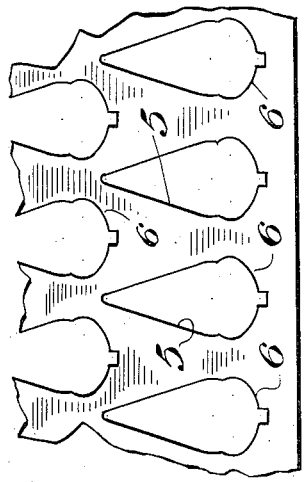
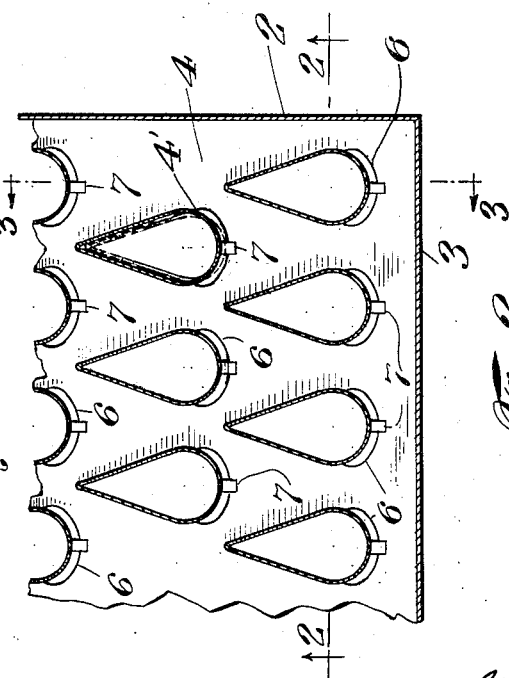
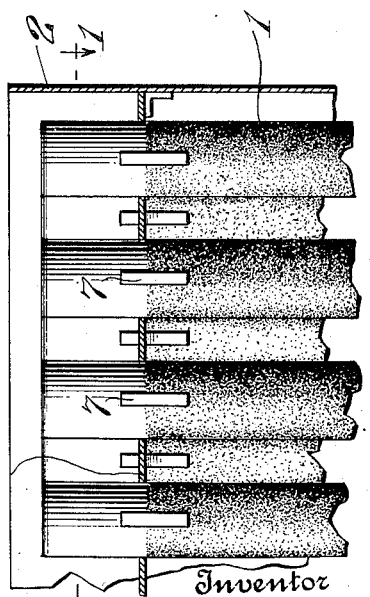

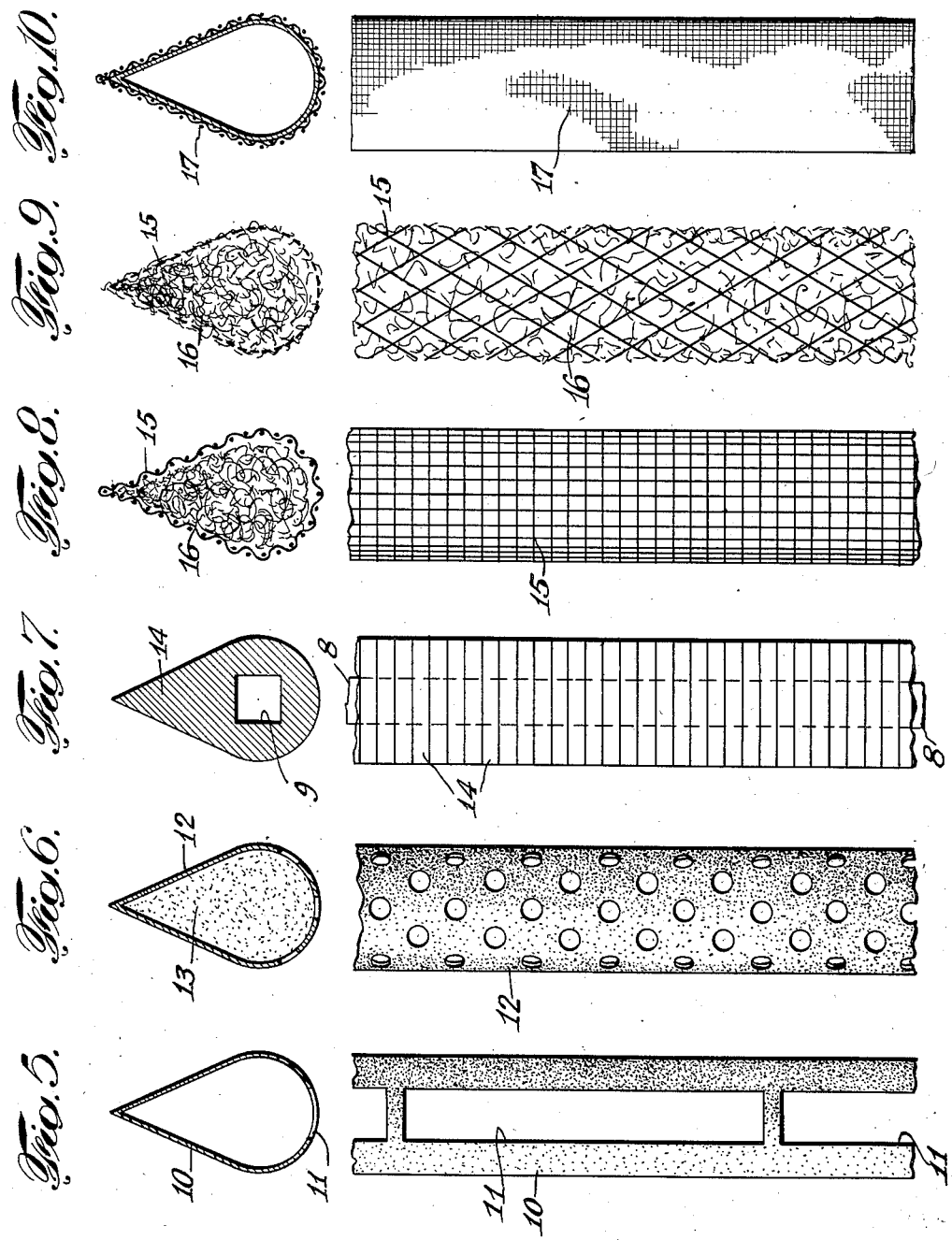

Patented Nov. 8, 1932

1,886,927

UNITED STATES PATENT OFFICE

CHARLES W. WILLIAMS, OF LOUISVILLE, KENTUCKY

AIR FILTER

Application filed September 9, 1927, Serial No. 218,387. Renewed January 16, 1931.

This invention relates to air filters and pertains more particularly to that type of filter in which dust and other solid particles are separated from an air or gas stream by causing them to be impinged upon surfaces which are coated with a film of viscous liquid.

It is an object of this invention to condition the said surfaces in such manner that the film of viscous liquid with which they are coated may adhere more firmly thereto and may resist the tendency of the flowing air or gas to sweep the film from the surfaces, thus leaving them dry and reducing their effectiveness for filtering purposes.

Other objects and advantages of the invention will appear hereinafter.

A preferred embodiment of the invention selected for purposes of illustration is shown in the accompanying drawings, in which, Figure 1 is a horizontal section on the line 1—1 of Figure 2, Figure 2 is a vertical section on the line 2—2 of Figure 1, Figure 3 is a vertical section on the line 3—3 of Figure 1, Figure 4 shows a section of the header plate, the deflector elements being removed, and Figures 5 to 10 inclusive illustrate modified forms of deflector elements.

The invention will be described herein as applied to an air or gas filter of the type in which filtering surfaces are provided which are coated with viscous liquid during a period of cessation of air flow, and which are subsequently, after a period of time has elapsed, washed and recoated by flushing with a large quantity of viscous liquid.

One type of filter surface which has been found particularly effective in such filters both from the point of view of filter efficiency and also of low resistance to air flow is that provided by deflector elements 1 having a substantially stream line cross section such as illustrated in the drawings. The said cleaning elements may be conveniently mounted in a suitable frame or housing having side and front walls 2 and 3 respectively and a header plate 4 which has openings 5 therein to receive and hold the upper ends of the deflector elements. A similar arrangement may be provided in the bottom of the housing to hold the lower ends of the said elements. The rear ends of the said openings are shaped to conform to the shape of the deflector elements so as to fit snugly thereagainst, but the front ends of the said openings bulge outwardly away from the cleaning elements somewhat, as indicated at 6, in order to permit the viscous liquid which is pumped to a reservoir or tank above the header plate to be distributed to the outer surfaces of the cleaning elements in order that they may be cleaned and recharged with a fresh film of viscous liquid. By arranging the openings in this manner the greater part of the viscous liquid is caused to flow down the front faces of the deflector elements where the greatest accumulations of dust and other solid particles occur.

In assembling elements 1 into the header 4 and a companion member (not illustrated) located in the bottom of the housing each element is first loosely placed in opening 5 as indicated by dotted lines in Figure 1 and is then forced to a final position, indicated by solid lines, causing the side walls of the elements to be compressed slightly as they pass the projections 4'. Upon reaching the solid line position the side walls spring back into normal position and securely retain the element in desired position. In order to assist in this operation as well as to hold the deflector elements firmly in position the wedges 7 may be provided if desired.

It has been discovered that the friction of the air or gas passing through the filter has a tendency to sweep the viscous liquid from the front surfaces of the deflector elements where it is most effective for filtering purposes. According to the present invention it is proposed to roughen or deform the surfaces of the cleaning elements, and particularly the front faces thereof in order that adhesive liquid may adhere more firmly and may resist the tendency of the fluid stream to sweep it from the surface. Preferably the preparation of the surfaces is accomplished by applying a surface coating of rough material as this has been found a cheap and satisfactory means of accomplishing the desired result. Liquid bakelite varnish which may be treated with metallic selenium or other flame inhibiting material and a finely divided non-matting, absorbent material such as wood flour has been found satisfactory for this purpose, the bakelite being applied to the surfaces which it is desired to prepare, after which the wood flour is sprinkled onto the sticky surface, after which the elements are subjected to the usual baking process to harden the varnish. When applied in this manner, the wood flour not only provides a roughened surface, but in addition, since the wood flour is applied to the surface of the varnish, a multiplicity of minute natural wood areas are exposed which serve to additionally retain the viscous liquid by reason of their absorbent or capillary attractive power.

As illustrated in Figures 2 and 3, only the front faces of the deflector elements have been prepared or treated, for with elements of this particular shape this has been found sufficient for most purposes. With elements of different shape, however, it has been found desirable to coat more or less of the surface, and it is to be understood that the invention is not limited to the preparing of any particular area of the surface. Neither is it limited to use with deflector elements of stream line cross section, for while it is particularly useful when applied to such elements it is also useful when applied to surfaces of different shapes where it is desired to retain a coating of viscous liquid.

In Figure 5 the invention is illustrated as applied to an element 10 which is provided with elongated vertical openings in its front face for the reception and arrest of heavy particles from the incoming air or gas stream. Such particles will enter the vertical openings and will strike the inner walls of the element.

In Figure 6 the invention is illustrated as applied to a deflector element 12 having its front face perforated and having its interior filled with a fibrous or wicking material 13 of high capillary power.

In the form illustrated in Figure 7, the element is composed of a plurality of layers or pieces 14, each provided with an opening 9 adapted to receive a core 8 of a molded material of relatively high capillary power upon which said layers or pieces are assembled.

In Figures 8 and 9 the deflector element is formed of foraminous material 15 which may be filled with wire or hair like material 16. If desired, the surfaces of both the foraminous material and the filler material may be coated with a binder to increase the absorptive effect upon the viscous liquid. In the form illustrated in Figure 9 the filler is preferably graduated, i. e., it is denser in the rear or pointed section than in the front, and preferably the ends of the filler material extend through the apertures in the foraminous material and project outwardly beyond the confines of the element walls.

In Figure 10 the deflector element is provided with a fabric covering 17 which may be applied either in the form of a tube or strip. If applied in strip form the fabric may be wound helically about the element. In this form the walls of the stream line element may be either solid or perforated, and if desired the interior of the element may be filled with wicking material as 13, in Figure 6, or the like.

It will be understood that the invention may be variously modified and embodied within the scope of the subjoined claims.

I claim as my invention:

1. A filter element having its exterior surface coated with a binder of liquid bakelite and wood flour adapted to roughen the surface so as to retain a coating of viscous liquid.

2. A filter element having its exterior surface coated with a binder of liquid bakelite and absorbent material adapted to roughen the surface so as to retain a coating of viscous liquid.

3. A filter element presenting an exterior surface comprising synthetic resin and divided material adherent to said resin and adapted to retain a coating of viscous liquid.

4. A filter element presenting an exterior surface comprising bakelite and an absorbent material in adhering relation thereto, said material being adapted to retain a coating of dust-catching liquid.

5. An air filter of the type in which dust and other solid particles are separated from an air or gas stream by causing them to be impinged upon surfaces which are coated with a film of dust-catching liquid, comprising filtering means arranged to define air deflecting passages, the deflecting portions of the filtering means presenting a surface composed of finely divided, non-matting, absorbent material which after being washed with a dust cleaning liquid will retain a definite portion thereof and substantially prevent it from being swept off during the flow of air.

6. A filter element presenting an exterior surface comprising bakelite and rough material in adhering relation thereto and adapted to retain a coating of viscous liquid.

In testimony whereof, I have signed my name to this specification this 5th day of September, 1927.

CHARLES W. WILLIAMS.